United States Patent [19]

Poirier

[11] Patent Number: 5,146,064

[45] Date of Patent: Sep. 8, 1992

[54] MECHANICAL SYSTEM FOR AUTOMATICALLY GUIDING ONE OR MORE ELECTRODES IN AN ARC-WELDING UNIT

[75] Inventor: Norbert Poirier, Nanterre, France

[73] Assignee: Serimer, Societe a Responsabilite Limitee, Nanterre, France

[21] Appl. No.: 634,434

[22] Filed: Dec. 27, 1990

[30] Foreign Application Priority Data

Dec. 29, 1989 [FR] France ................. 89 17412

[51] Int. Cl.$^5$ ............................. B23K 9/12
[52] U.S. Cl. .............................. 219/124.34
[58] Field of Search ........... 219/124.34, 124.22

[56] References Cited

U.S. PATENT DOCUMENTS 2,441,507  5/1948  Peters ................ 219/124.34
2,827,548  3/1958  Griswold ............ 219/124.34

FOREIGN PATENT DOCUMENTS 243452   3/1987  German Democratic
                  Rep. .................. 219/124.34
54-40220 12/1979 Japan ................ 219/124.34

Primary Examiner—Clifford C. Shaw

[57] ABSTRACT

A mechanical guidance system for automatically guiding one or more electrodes of an arc-welding unit along a groove delimited by the facing chamfered end surfaces of two metal parts to be welded together, the guidance system being of the type comprising a main carriage which is moved along a fixed guide extending parallel to the groove, a secondary carriage hinged to the main carriage and fitted with an electrode support block, and a guidance device comprising running members in contact with the surfaces of the metal parts on either side of the groove and feeler members which penetrate into the groove, wherein the guidance device includes two feeler members which are in contact with respective ones of the two side walls of the groove and which are respectively situated towards the front and towards the rear of the secondary carriage relative to the displacement direction of the main carriage.

8 Claims, 3 Drawing Sheets

MECHANICAL SYSTEM FOR AUTOMATICALLY GUIDING ONE OR MORE ELECTRODES IN AN ARC-WELDING UNIT

FIELD OF THE INVENTION

The present invention relates to a mechanical guidance system for automatically guiding one or more electrodes of an arc-welding unit along a groove delimited by the facing chamfered end surfaces of two metal parts to be welded together, the guidance system being of the type comprising a main carriage which is moved along a fixed guide extending parallel to the groove, a secondary carriage hinged to the main carriage and fitted with an electrode support block, and a guidance device comprising running members in contact with the surfaces of the metal parts on either side of the groove and feeler members which penetrate into the groove.

BACKGROUND OF THE INVENTION

In general, an automatic welding machine brings a large number of operating parameters into play relating to the welding method used, to the geometrical characteristics of the groove delimited between the two parts to be welded together, and to welding conditions (nature, shape and position of the parts, ...). In most industrial applications, a welding operation is performed in several passes, and obtaining a high quality weld depends on the accuracy with which the first pass is performed. This implies that the end surfaces to be welded together need to be machined to delimit a groove between them which is as regular as possible, and that a guidance system should be provided which is suitable for tracking the shape of the groove so that the welding is applied very accurately to the bottom of the groove, particularly during the first pass.

Thus, it is common practice to machine a chamfer on the two ends to be welded together. Depending on the angle given to the chamfer, the resulting groove is flared to a greater or lesser extent, and the wider the groove the greater the number of passes and the longer the welding time. Although a narrow groove avoids the above drawbacks, is not without difficulties for the guidance system, as described below.

In practice, even after such machining, the groove delimited by the two chamfers cannot have constant geometrical characteristics over its entire length. Once the two end surfaces have been brought face to face, the manufacturing tolerances that apply to the parts to be welded together and to the machining of the chamfers necessarily give rise to variations in the width and height of the groove. When the two parts to be welded together are tubes of considerable length, for example, with the chamfers being machined to a tolerance of ±0.1 mm, the resulting tolerance on the width of the groove is ±0.2 mm in conjunction with differences in level of 2 mm to 3 mm, due in particular, to ovalization of the tubes.

When the welding method is electric arc welding, and visible under a protective gas as is commonly used for welding tubes end-to-end, the welding electrodes carried by the electrode holders must penetrate into the groove and lie at a determined distance from the walls and the bottom of the groove or from the previous layer of welding. Under these conditions, the accuracy of the guidance system becomes of great importance, particularly when the welding method is used in a narrow groove.

Consequently, welding accuracy, particularly during the first pass, requires the welding electrodes to be accurately positioned not only relative to the midplane of the groove, but also relative to the bottom of the groove. The more accurate the guidance system, the closer these two positioning constraints are satisfied, with midplane positioning being sensitive to variations in groove width and with bottom positioning being sensitive to variations in difference in level.

In prior mechanical guidance systems, the running means are wheels which run on both sides or along one side of the groove, and the feeler members are also constituted by at least one wheel running along the inside of the groove and bearing simultaneously against both walls thereof. Experience shows that such feeler members are ill-adapted to a narrow groove and that they do not take account of variations in the width and in the difference in level of the groove.

An object of the invention is to provide a guidance system capable of positioning welding electrodes accurately inside the groove and capable of taking account of variations in width and differences in level thereof, thereby improving welding quality as is required in certain applications, in particular for welding lengths of tube end-to-end to construct pipelines for placing on the seabed.

SUMMARY OF THE INVENTION

To this end, the present invention provides a guidance system of the type specified above wherein the guidance device includes two feeler members which are in contact with respective ones of the two side walls of the groove and which are respectively situated towards the front and towards the rear of the secondary carriage relative to the displacement direction of the main carriage.

In another disposition of the invention, the guidance device includes two running members which run on respective ones of the two metal pieces on either side of the groove and which are likewise situated respectively towards the front and towards the rear of the secondary carriage relative to the displacement direction of the main carriage.

In yet another disposition of the invention, the guidance system is hinged about two mutually perpendicular pivot axes to enable the feeler members and the running members to follow the shape of the groove not only internally (variations in width) but also externally (differences in level), thrust means being provided to urge the secondary carriage continuously by means of the running members of the guidance device bearing against the surfaces of the parts on either side of the groove, while the feeler members are themselves urged permanently by lateral thrust means into contact with the walls of the grooves.

In one embodiment, the guide device includes two wheels whose flanges form the feeler members and whose tires form the running members.

In a preferred embodiment of the invention, each feeler element is constituted by a bead fixed at the end of a finger which penetrates into the groove and whose depth of penetration is adjustable, while each running member is in the form of a ball or of a flat wheel.

Thus, by means of these various dispositions, with the electrode holders advantageously being disposed between the two feeler members, variations in the width and differences in level of the groove have only a small effect on the welding electrodes, such that the distance of the electrodes from the midplane and from the bottom of the groove is kept to a minimum, thereby ensuring that the geometrical characteristics of the groove are tracked better and obtaining better welding accuracy.

BRIEF DESCRIPTION OF THE DRAWINGS

Embodiments of the invention are described by way of example with reference to the accompanying drawings, in which.

MORE DETAILED DESCRIPTION

Figure 1:
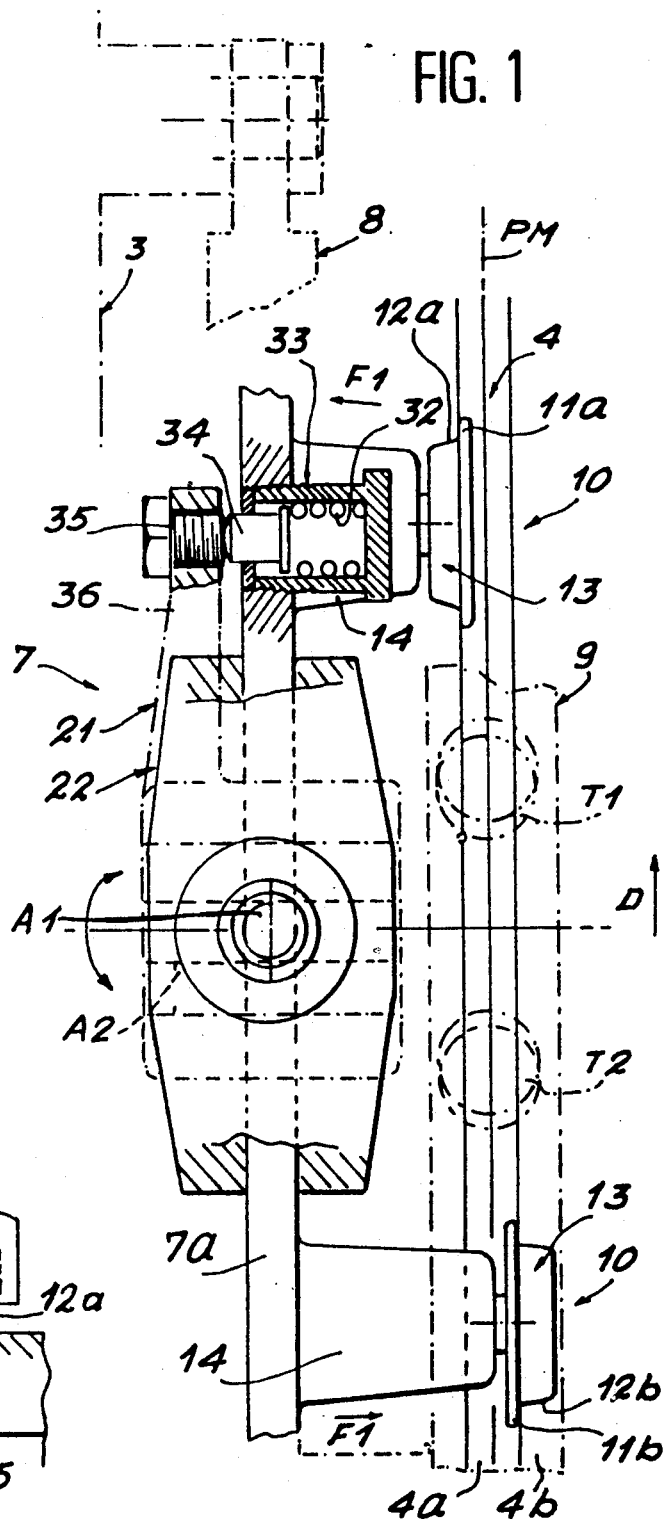
FIG. 1 is a diagram showing the principles on which a first embodiment of a mechanical guidance system of the invention is based.
Figure 2:
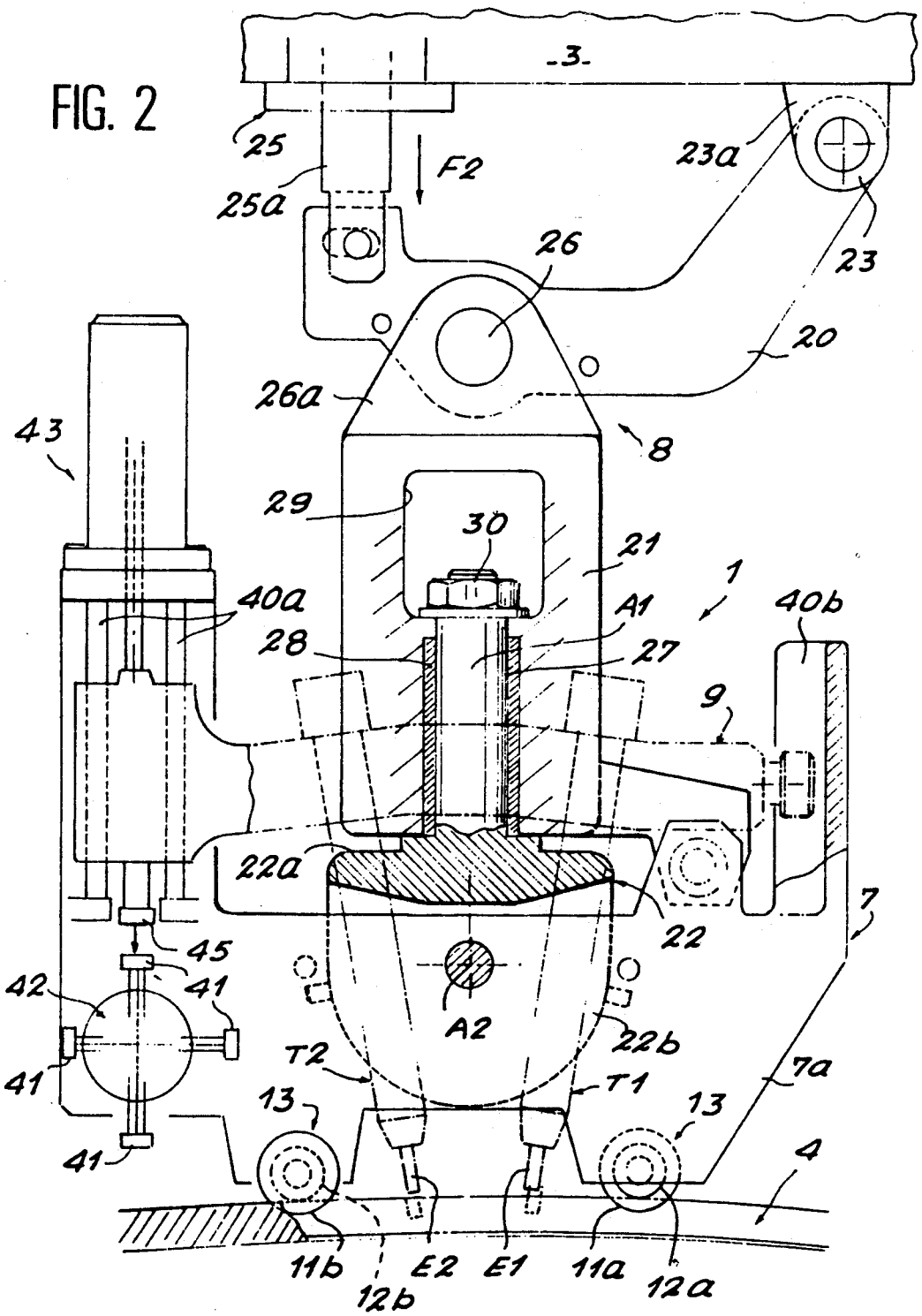
FIG. 2 is a simplified diagrammatic section through the mechanical guidance system as applied to welding tubes.
Figure 3:
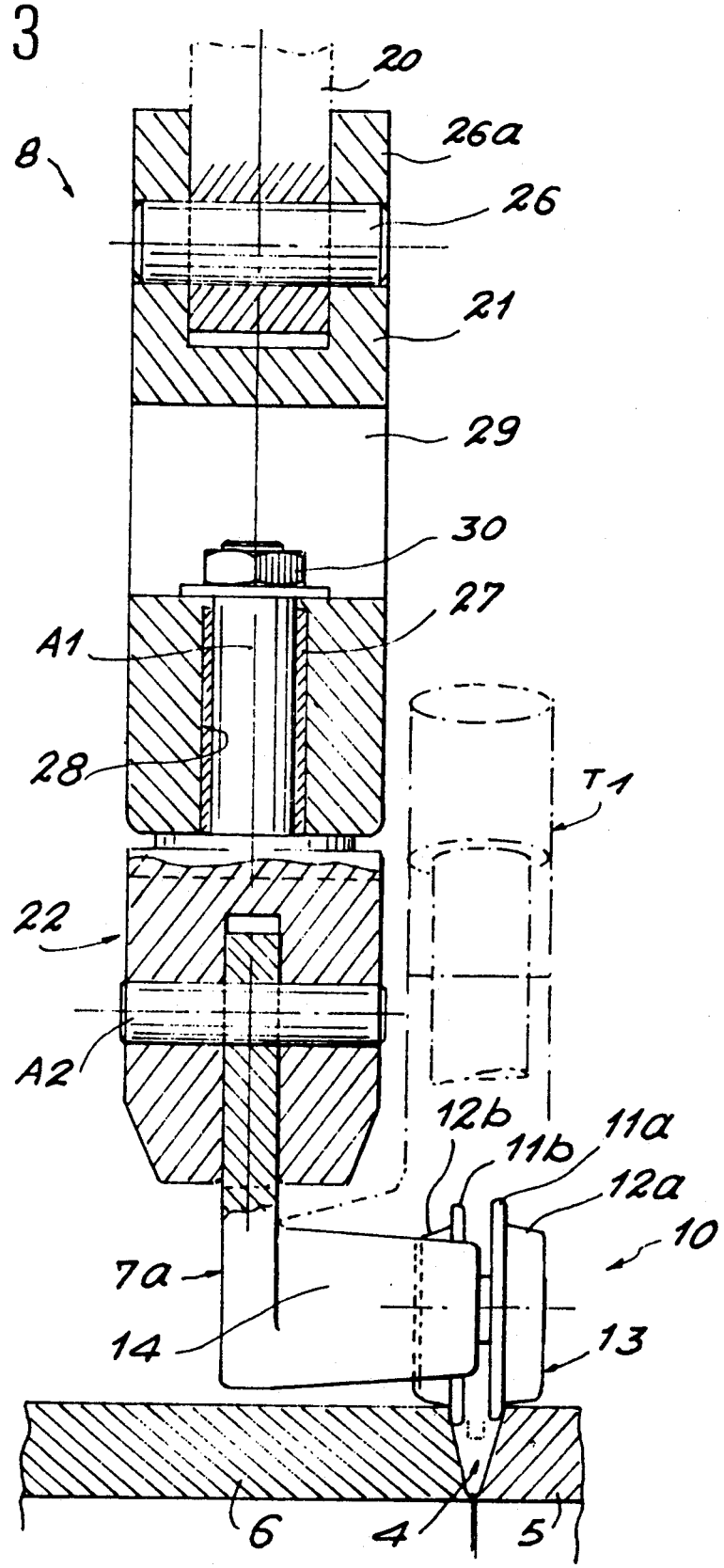
FIG. 3 is a end view of the guidance system in partial section.

The automatic mechanical guidance system 1 for guiding one or more electrodes in an arc-welding unit and as shown diagrammatically in FIGS. 1 to 3 comprises a main carriage 3 which moves along a circular guide (not shown) parallel to a circular groove 4 delimited by the two chamfered end faces of respective metal tubes 5 and 6 that are to be welded together (FIG. 3). A secondary carriage 7 having a plate body 7a which is connected to the main carriage 3 by a connection assembly 8 carries a support block 9 for two electrode holders T1 and T2 of a welding unit. The secondary carriage 7 is fitted with a mechanical guidance device 10 to which the present invention relates more particularly, and which is described in detail below.

The guidance device 10 includes feeler members and running members. In a preferred embodiment of the invention, there are two feeler members 11a and 11b, and two running members 12a and 12b.

The two feeler members 11a and 11b are offset relative to each other, being situated respectively towards the front and towards the rear of the second carriage 7 relative to the displacement direction D of the main carriage 3, and the same applies to the positions of the two running members 12a and 12b.

The two feeler members 11a and 11b penetrate into the groove 4 and make contact with respective ones of its two walls 4a and 4b, while the two running members 12a and 12b come into contact with the surfaces of respective ones of the two parts 5 and 6 on either side of the groove 4.

In the first embodiment of FIG. 1, the guidance device 10 is constituted by two wheels 13. The flange of each wheel constitutes one of the feeler members 11a and 11b, while the tire of each wheel constitutes one of the running members 12a and 12b.

Each wheel 13 is supported in rotation by a lateral projection 14 from the plate constituting the body 7a of the secondary carriage 7, with the axis of rotation of each wheel being perpendicular to the midplane PM of the groove 4 so that its tire runs over the associated metal part 5 or 6 substantially parallel to the groove 4.

The guidance device 10 carried by the plate 7a of the secondary carriage 7 is hinged about two mutually perpendicular pivot axes A1 and A2. The axis A1 is perpendicular to the displacement direction D of the main carriage 3 and is situated in a plane parallel to the midplane PM of the groove 4, thereby enabling the guidance device 10 to pivot about the axis A1 so that the feeler members 11a and 11b can follow the geometry of the walls of the groove 4. The axis A2 is perpendicular to the midplane PM of the groove 4 so that the guidance device 10 can pivot about this axis A2, thereby enabling the running members 12a and 12b to follow the geometry of the surfaces of the parts 5 and 6 on either side of the groove 4.

With reference to FIG. 2, the above-mentioned connection assembly 8 between the main carriage 3 and the secondary carriage 7 comprises a connection arm 20, a connection piece 21 and a fork 22. The connection arm 20 is hinged at one end about a pin 23 carried by a fork 23a on the main carriage 3. Near its other end, the connection arm 20 is hinged to the end of a piston rod 25a of an actuator 25 whose cylinder is fixed to the main carriage 3. The function of the actuator 25 is explained below. The connection piece 21 is hinged at one end to the connection arm 20 by means of a fork 26a and a pin 26, and at its other end it bears against the base 22a of the fork 22.

The pivot axis A1 of the guidance device 10 constitutes a swivel axis embodied by a pin having one end fixed to the base 22a of the fork 22 and extending perpendicularly therefrom. The swivel pin is received in a bearing 27, itself received in a bore 28 formed in the connection piece 21 and opening out at its free end via a central opening 29 in the link piece 21. The free end of the swivel pin is threaded and receives a nut 30, thereby fixing the axial position of the swivel pin.

Pivot axis A2 of the guidance device 10 is a pitch axis perpendicular to the swivel axis A1 and constituted by a pitch pin supported by the two side plates 22b of the fork 22, with the plate 7a of the secondary carriage 7 carrying the guidance device 10 pitching about the pitch axis A2.

The guidance device 10 is thus capable of pitching directly about the pin A2 and of swivelling via the fork 22 about the axis of the swivel pin received in the bearing 27.

The secondary carriage 7 is permanently subjected to thrust forces F1 and F2 which are transmitted respectively to the feeler members 11a, 11b and to the running members 12a, 12b.

Lateral thrust means (FIG. 1) such as a spring 32, are provided to urge the secondary carriage 7 permanently to swivel about the axis A1 so that the two feeler members 11a and 11b remain permanently in contact with the corresponding walls 4a and 4b of the groove 4 regardless of any variation in the width of the groove. These thrust means are naturally offset from the swivel axis A1 so that the force F1 provided by the thrust means gives rise to a moment urging the secondary carriage 7 to swivel. The spring 32 is received in a housing 33 fixed to the plate 7a of the secondary carriage 7 and it causes a stud 34 to project from the housing 33. The stud 34 bears against the end of a screw 35 carried by a lever 36 projecting from the connection piece 21. The screw 35 enables the stud 34 to be moved, thereby adjusting the thrust force F1 provided by the spring 32 and urging the plate 7a of the secondary carriage 7 to swivel about the axis A1.

Thrust force F2 (FIG. 2) is exerted by the abovementioned actuator 25 which acts on connection on 30 and consequently on connection piece 21 and thus on the fork 22 so as to cause the secondary carriage 7 to bear permanently on the tubes 5 and 6 via the running members 12a and 12b of the guidance device 10.

The combination of the forces F1 and F2 thus causes the flanges of the wheels 13 to be kept in permanent contact with the walls 4a, 4b of the groove 4 (force F1), and causes the tires of the wheels 13 to maintain permanent contact with the tubes 5 and 6 on either side of the groove 4 (force F2).

In this example, the support block 9 carries two electrode holders T1 and T2 which are situated between the two feeler and running assemblies 11a & 12a and 11b & 12b.

Advantageously, the support block 9 is movable relative to the secondary carriage 7 so as to be able to adjust the penetration depth of the electrodes E1 and E2 inside the groove 4 after each welding pass. To this end, the support block 9 is mounted to slide along two slideways 40a and 40b (FIG. 2) carried by the plate 7a of the secondary carriage 7. In order to adjust the penetration depth of the two electrodes E1 and E2 very accurately, it is advantageous to provide abutments 41 at different heights and mounted on a rotary drum 42. An actuator 43 fixed to the plate 7a of the secondary carriage 7 has its piston rod 44 fixed to the support block 9 to move it along the slideways 40a and 40b, thereby bringing a stud 45 on the support block 9 into contact with the selected abutment 41 of the drum 42. In addition, the support block 9 may also be caused to oscillate at adjustable frequency and amplitude by mechanical or electrical means, in conventional manner.

Figure 4:
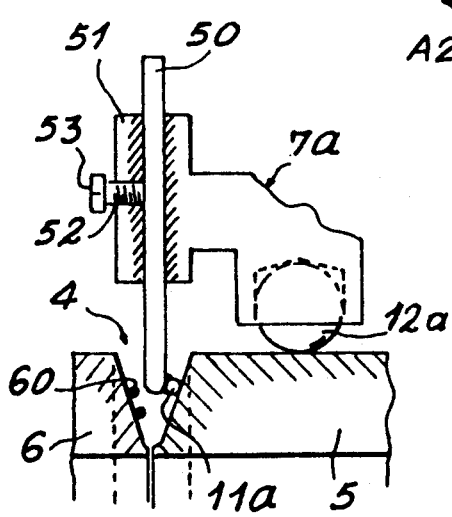
FIG. 4 is a diagrammatic view of a feeler member in a preferred embodiment of the invention.

In a variant shown in FIG. 4, each feeler member 11a and 11b is constituted by a lateral bead carried at the end of a finger 50 which penetrates inside the groove 4. The finger may be constituted by a vertical rod and is slidably mounted in a sleeve 51 having a tapped side hole 52 having blocking means 53 such as a screw engaged therein, thereby enabling the penetration depth of each bead to be adjusted. This adjustment, in combination with the adjustment of the support block 9, makes it possible to obtain a considerable increase in welding accuracy. Feeler means 11a and 11b constituted by beads 11a and 11b are better adapted to a narrow groove than are the flanges of wheels.

When the feeler members are constituted by beads, the running members 12a and 12b should no longer have flanges. They may thus be constituted by flangeless wheels, or else by balls as shown in FIG. 4. In addition, given that weld splashes 60 will inevitably be formed on the walls 4a and 4b of the groove 4 during the various welding passes, the fact of separating the feeler function from the running function so that these functions are performed by distinct items (ball+bead), reduces the harmful effects of these splashes. When a wheel has a flange constituting a feeler member, then its tire tends to be lifted off the running surface whenever its flange is passing over a weld splash 60.

In general, the guidance device 10 has two feeler and running assemblies 11a & 12a and 11b & 12b, and the electrode holders T1 and T2 are preferably placed between these two assemblies. When using wheels 13 the feeler zone of the flange and the running zone of the tire are close together, whereas when using a bead as a feeler and a ball as the running member (or a flangeless wheel), then the feeler zone may be at a distance from the running zone.

The mechanical guidance system of the invention is particularly suited to end-to-end welding of lengths of tube for undersea pipelines for offshore oil and gas fields. Naturally the guidance system is used essentially during the first welding passes, i.e. while the feeler members can penetrate into the groove, and the final welding passes are formed elsewhere, e.g. using a conventional welding station.

In general, the guidance system is equally applicable to making horizontal and vertical rectilinear welds as it is to making circular welds.

I claim:

1. A mechanical guidance system for automatically guiding one or more electrodes of an arc welding unit in and along a groove delimited by mutually facing, chamfered end surfaces of two metal parts to be welded together, said guidance system comprising a main carriage which is movable along a fixed guide extending parallel to the groove, a secondary carriage provided with an electrode support block having at least one welding electrode mounted thereon, hinged connection means pivotally connecting said secondary carriage to said main carriage, and guide means comprising running members in contact with outer surfaces of the metal parts adjacent said groove and feeler members, which penetrate into the groove and are in contact with the chamfered end surfaces of said metal parts delimiting said groove, wherein said guide means comprises a first set of said feeler and running members, which is mounted at a front end of said secondary carriage and which includes a front feeler member engaging a first one of said two chamfered end surfaces and a front running member engaging the outer surface of a first one of the two metal parts on one side of said groove, and a second set of said feeler and running members, which is mounted at a rear end of said secondary carriage and which includes a rear feeler member engaging a second one of said two chamfered end surfaces and a rear running member engaging the outer surface of a second one of the two metal parts on a second side of said groove, and wherein said electrode support block is mounted on said secondary carriage between said first and second sets of feeler and running members, and wherein said hinged connection means comprises a first pivot axis which extends perpendicularly to a moving direction of the main carriage and lies in a plane parallel to the longitudinal midplane of said groove, and a second pivot axis which extends perpendicularly to said moving direction and to said midplane, said first and second pivot axis being located between said first and second sets of feeler and running members, and wherein said guidance system further comprises lateral thrust means acting on the secondary carriage to urge said secondary carriage to swivel about said first axis so as to maintain said front and rear feeler members in contact with said first and second chamfered end surfaces, respectively, and further thrust means urging said front and rear running members to bear against the outer surface of said first and second metal parts, respectively, while causing the secondary carriage to pivot about said second axis by the engagement of said front and rear running members with the respective outer surfaces of said metal parts.

2. A mechanical guidance system according to claim 1, wherein the lateral thrust means is constituted by a spring.

3. A mechanical guidance system according to claim 1, wherein said hinged connection means comprises a fork-shaped member having a base portion, two parallel side plate portions extending from one side of said base portion, and a shank portion extending from a side of said base portion opposite said one side, said secondary carriage being pivotally mounted between said two side plate portions through said second pivot axis, and said shank portion forming said first pivot axis and being received in a bearing connected to the main carriage.

4. A mechanical guidance system according to claim 1, wherein each of said first and second sets of feeler and running members comprises a single-flanged wheel having a lateral flange portion and a tire portion which form the feeler member and the running member, respectively, of the corresponding set of feeler and running members.

5. A mechanical guidance system according to claim 1, wherein each feeler member is constituted by a bead carried at the end of a finger which penetrates into the groove.

6. A mechanical guidance system according to claim 5, wherein said finger is slidably mounted in said secondary carriage, whereby the penetration depth of the finger in the groove is adjustable.

7. A mechanical guidance system according to claim 5, wherein each running member is constituted by a ball.

8. A mechanical guidance system according to claim 5, wherein each running member is constituted by a flangeless wheel.

* * * * *